United States Patent
Nagayama et al.

(10) Patent No.: US 10,106,466 B2
(45) Date of Patent: *Oct. 23, 2018

(54) THERMAL SPRAY MATERIAL, THERMAL SPRAY COATING AND THERMAL SPRAY COATED ARTICLE

(71) Applicants: TOKYO ELECTRON LIMITED, Minato-ku, Tokyo (JP); FUJIMI INCORPORATED, Kiyosu-shi, Aichi (JP)

(72) Inventors: Nobuyuki Nagayama, Miyagi (JP); Hiroyuki Ibe, Kiyosu (JP); Kazuyuki Tsuzuki, Kiyosu (JP)

(73) Assignees: TOKYO ELECTRON LIMITED, Tokyo (JP); FUJIMI INCORPORATED, Kiyosu-Shi (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/142,204

(22) Filed: Apr. 29, 2016

(65) Prior Publication Data

US 2016/0326059 A1    Nov. 10, 2016

(30) Foreign Application Priority Data

May 8, 2015 (JP) ................. 2015-095516
Mar. 7, 2016 (JP) ................. 2016-043940

(51) Int. Cl.
| | |
|---|---|
| C04B 35/505 | (2006.01) |
| C23C 4/12 | (2016.01) |
| C01F 17/00 | (2006.01) |
| C23C 4/04 | (2006.01) |
| C04B 35/515 | (2006.01) |
| C04B 35/553 | (2006.01) |
| C04B 35/626 | (2006.01) |

(52) U.S. Cl.
CPC ........ C04B 35/505 (2013.01); C01F 17/0062 (2013.01); C04B 35/5156 (2013.01); C04B 35/553 (2013.01); C04B 35/62665 (2013.01); C23C 4/04 (2013.01); C01P 2002/72 (2013.01); C01P 2004/64 (2013.01); C04B 2235/80 (2013.01); C04B 2235/96 (2013.01)

(58) Field of Classification Search
CPC . C04B 35/505; C04B 35/5156; C04B 35/553; C23C 4/10; C23C 4/11
See application file for complete search history.

(56) References Cited

U.S. PATENT DOCUMENTS

| | | | | |
|---|---|---|---|---|
| 9,017,765 | B2* | 4/2015 | Sun | ...................... C04B 41/4539 |
| | | | | 427/376.1 |
| 9,388,485 | B2* | 7/2016 | Fukagawa | ................. C23C 4/10 |
| 2014/0057078 | A1* | 2/2014 | Hamaya | .................... C09D 5/18 |
| | | | | 428/148 |
| 2015/0096462 | A1 | 4/2015 | Fukagawa et al. | |
| 2015/0111037 | A1* | 4/2015 | Fukagawa | ................. C23C 4/10 |
| | | | | 428/402 |
| 2015/0361540 | A1* | 12/2015 | Hamaya | .................... C09D 5/18 |
| | | | | 501/126 |
| 2016/0326058 | A1* | 11/2016 | Nagayama | ................. C23C 4/04 |
| 2016/0326059 | A1* | 11/2016 | Nagayama | ............ C04B 35/505 |
| 2016/0326623 | A1* | 11/2016 | Nagayama | ................. C23C 4/11 |

FOREIGN PATENT DOCUMENTS

| | | |
|---|---|---|
| JP | 2014-109066 | 6/2014 |
| JP | 5911036 | 4/2016 |
| WO | WO-2014/002580 A1 | 1/2014 |

OTHER PUBLICATIONS

Nagayama: US Office Action on U.S. Appl. No. 15/142,172 dated Jan. 18, 2017.
Nagayama: US Office Action on U.S. Appl. No. 15/142,181 dated Jan. 13, 2017.
Nagayama: U.S. Office Action on U.S. Appl. No. 15/142,172 dated Sep. 1, 2017.
Nagayama: U.S. Office Action on U.S. Appl. No. 15/142,181 dated Sep. 1, 2017.
Nagayama: US Office Action on U.S. Appl. No. 15/142,181 dated Jan. 16, 2018.
Nagayama: US Office Action on U.S. Appl. No. 15/142,172 dated Jan. 16, 2018.
Nagayama: U.S. Notice of Allowance on U.S. Appl. No. 15/142,181 dated May 25, 2018.
Nagayama: U.S. Notice of Allowance on U.S. Appl. No. 15/142,172 dated Jun. 8, 2018.

* cited by examiner

Primary Examiner — Karl E Group
(74) Attorney, Agent, or Firm — Foley & Lardner LLP

(57) ABSTRACT

This invention provides a thermal spray material capable of forming a thermal spray coating excellent in plasma erosion resistance as well as in properties such as porosity and hardness. The thermal spray material comprises a rare earth element oxyhalide (RE-O-X) which comprises a rare earth element (RE), oxygen (O) and a halogen atom (X) as its elemental constituents. The thermal spray material has an X-ray diffraction pattern that shows a main peak intensity $I_A$ corresponding to the rare earth element oxyhalide, a main peak intensity $I_B$ corresponding to a rare earth element oxide and a main peak intensity $I_C$ corresponding to a rare earth element halide, satisfying a relationship $[(I_B+I_C)/I_A]<0.02$.

8 Claims, 1 Drawing Sheet

(a)
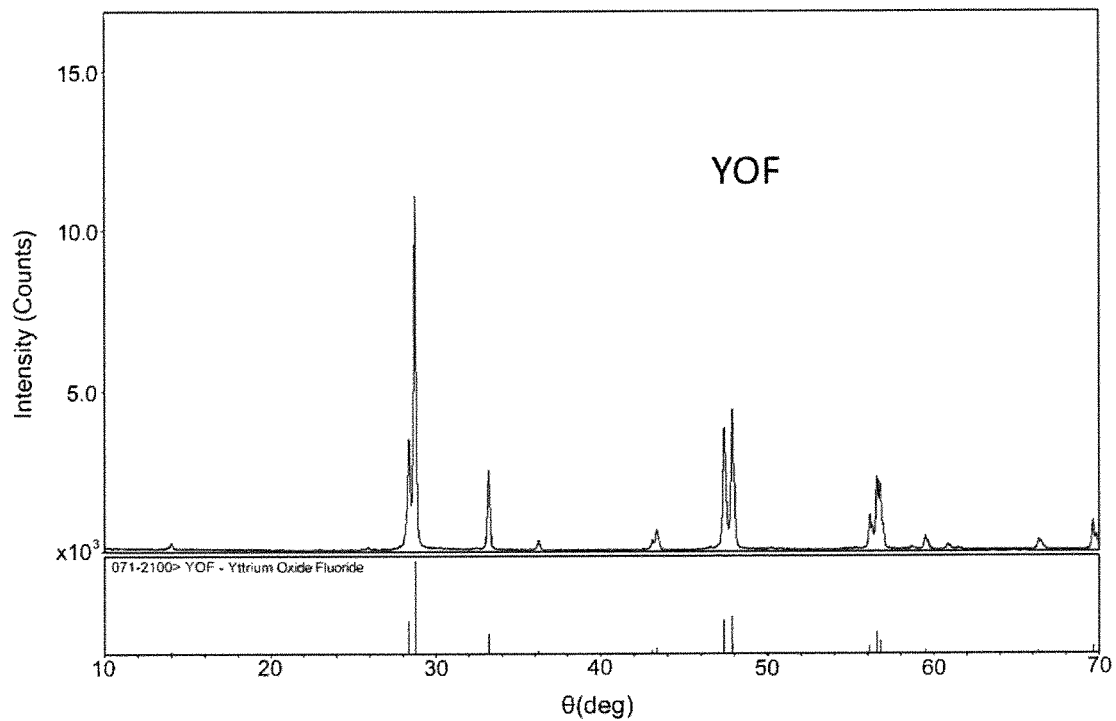
(b)
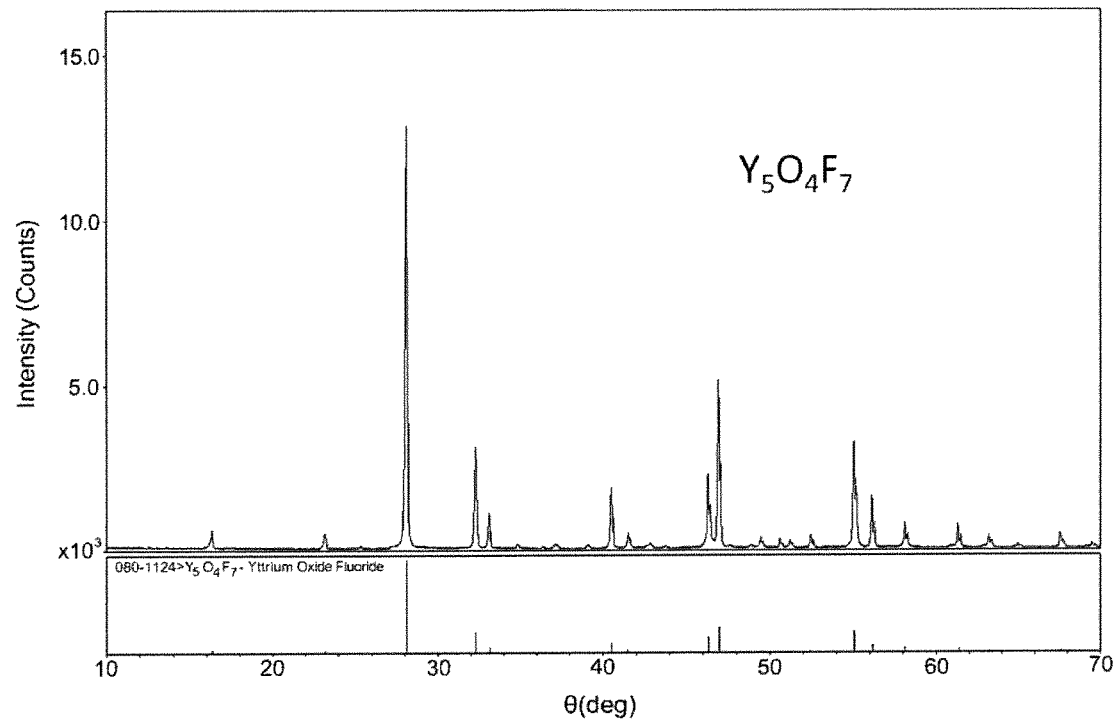

THERMAL SPRAY MATERIAL, THERMAL SPRAY COATING AND THERMAL SPRAY COATED ARTICLE

CROSS-REFERENCE

The present application claims priority to Japanese Patent Application No. 2015-095516 filed on May 8, 2015 and Japanese Patent Application No. 2016-043940 filed on Mar. 7, 2016. The entire contents of these applications are incorporated herein by reference.

BACKGROUND OF THE INVENTION

1. Field of the Invention

The present invention relates to a thermal spray material, a thermal spray coating formed with the thermal spray material, and a thermal spray coated article.

2. Description of the Related Art

Technologies to coat substrate surfaces with various materials to add new functionalities have been conventionally used in various fields. One known example of such surface coating technologies is thermal spray technology where a substrate surface is thermal-sprayed with particles formed with a material such as ceramic softened or melted by combustion or electrical energy, thereby to form a thermal spray coating made of the material.

In industries of manufacturing semiconductor devices and the like, generally, the surfaces of semiconductor substrates are very finely processed by dry etching with plasma of a halogen gas such as fluorine, chlorine and bromine. After the dry etching process, the chamber (vacuum container) from which the semiconductor substrates have been removed are cleaned with oxygen gas plasma. During this, in the chamber, there are possibilities of erosion occurring on members exposed to the highly reactive oxygen gas plasma or halogen gas plasma. If the erosion areas fall as particles from these members, these particles may be deposited on the semiconductor substrates, becoming contaminants (or "particles" hereinafter) to cause circuit defects.

Thus, conventionally, in equipment for manufacturing semiconductor devices, to reduce the formation of particles, members exposed to plasma of oxygen gas, halogen gases and the like are provided with a thermal spray ceramic coating with plasma erosion resistance. For instance, International Application Publication No. 2014/002580 teaches that by using granules that comprise an yttrium oxyfluoride at least partially as the thermal spray material, a thermal spray coating can be formed with high resistance to plasma erosion.

SUMMARY OF THE INVENTION

With increasing degrees of integration of semiconductor devices, more precise management of particle contamination is required. Greater plasma erosion resistance is thus required also from thermal spray ceramic coatings provided to equipment for manufacturing semiconductor devices. For thermal spray coatings, favorable properties such as porosity and hardness are also preferred, for instance, in view of obtaining great durability, etc.

In view of these circumstances, an objective of this invention is to provide a thermal spray material capable of forming a thermal spray coating having greater plasma erosion resistance as well as other great properties such as hardness with a low porosity. Other objectives are to provide a thermal spray coating and a thermal spray coated article fabricated with the thermal spray material.

As a solution to the problem, this invention provides a thermal spray material having the following characteristics. In particular, the thermal spray material disclosed herein is characterized by: comprising a rare earth element oxyhalide (RE-O—X) which comprises a rare earth element (RE), oxygen (O) and a halogen atom (X) as its elemental constituents; and having an X-ray diffraction pattern that shows a main peak intensity $I_A$ corresponding to the rare earth element oxyhalide, a main peak intensity $I_B$ corresponding to a rare earth element oxide and a main peak intensity $I_C$ corresponding to a rare earth element halide at a ratio of sum of the intensities $I_B$ and $I_C$ to the intensity $I_A$, $[(I_B+I_C)/I_A]$, of less than 0.02.

According to studies by the present inventors, a thermal spray material comprising a rare earth element oxyhalide can form a thermal spray coating with superior erosion resistance against halogen plasma as compared to a thermal spray material comprising a rare earth element oxide, a rare earth element halide, etc. Rare earth element oxides and rare earth element halides are materials generally used in preparation of such rare earth element oxyhalides. They may remain in the resulting thermal spray materials, for instance, as unreacted reactants. For example, when a thermal spray material comprises such a rare earth element oxide and a rare earth element halide, by keeping their combined amount within a range that satisfies the intensity ratio given above, it is possible to form a thermal spray coating excellent in plasma erosion resistance as well as in properties such as porosity and hardness.

Here, the "main peak" refers to the peak having the largest peak height (i.e. the highest diffraction intensity) in a group of diffraction peaks of an arbitrary compound detected in its X-ray diffraction pattern.

It is noted that Patent Document 1 discloses thermal spray materials comprising relatively high ratios of yttrium oxyfluoride (YOF) (see Examples 9 to 11). However, it is silent regarding the data of X-ray diffraction analysis of these thermal spray materials and a material with at least 77% by mass YOF but free of yttrium oxide ($Y_2O_3$). That is, the thermal spray material disclosed herein is a novel thermal spray material that can form a thermal spray coating excellent in plasma erosion resistance as well as in properties such as porosity and hardness.

In a preferable embodiment, the thermal spray material disclosed herein may be essentially free of the rare earth element halide. It can also be in an embodiment essentially free of the rare earth element oxide.

According to such an embodiment, as described above, the resulting thermal spray coating can be provided with increased plasma erosion resistance along with a lower porosity and increased hardness.

In a preferable embodiment, the thermal spray material disclosed herein is characterized by the rare earth element oxyhalide having a halogen to rare earth element molar ratio (X/RE) of 1.1 or greater. This molar ratio (X/RE) is more preferably 1.3 or greater, but 1.38 or less. The oxygen to rare earth element molar ratio (O/RE) is preferably 0.9 or less.

It is favorable because by increasing the halogen content of the rare earth element oxyhalide in the thermal spray material, the resistance to halogen plasma can be further increased. It is favorable also because, with a lower oxygen content of the rare earth element oxyhalide in the thermal spray material, a rare earth element oxide is less likely to form in the thermal spray coating. It is also preferable because when adjustment is made to bring these features to a good balance, a thermal spray coating can be obtained with a low porosity and high Vickers hardness.

In a preferable embodiment, the thermal spray material disclosed herein is characterized by the rare earth element being yttrium, the halogen being fluorine, and the rare earth element oxyhalide being an yttrium oxyfluoride. Such an embodiment provides, for instance, a thermal spray material capable of forming a thermal spray coating with excellent erosion resistance especially to fluorine plasma.

In another aspect, the present invention provides a thermal spray coating that is a thermal spray deposit of an aforementioned thermal spray material (a thermal spray coating formed from a thermal spray material disclosed herein). The rare earth element oxide content in the thermal spray coating can embrittle the thermal spray coating to degrade the plasma resistance. The thermal spray coating disclosed herein is formed by thermal spraying of an aforementioned thermal spray material. Because its rare earth element oxide content is reduced, it is provided as a coating with surely greater plasma erosion resistance.

The thermal spray coating provided by this invention is characterized by: comprising, as its primary component, a rare earth element oxyhalide (RE-O—X) which comprises a rare earth element (RE), oxygen (O) and a halogen atom (X) as its elemental constituents; and having an X-ray diffraction pattern that shows a main peak intensity $I_{CA}$ corresponding to the rare earth element oxyhalide, a main peak intensity $I_{CB}$ corresponding to a rare earth element oxide and a main peak intensity $I_{CC}$ corresponding to a rare earth element halide at a ratio of sum of the intensities $I_{CB}$ and $I_{CC}$ to the intensity $I_{CA}$, $[(I_{CB}+I_{CC})/I_{CA}]$, of 0.45 or less.

According to such a constitution, the thermal spray coating has decreased rare earth element oxide and rare earth element halide contents; and therefore, it can be provided with surely increased plasma erosion resistance along with a lower porosity and increased hardness.

In a preferable embodiment, the thermal spray coating disclosed herein is characterized by being essentially free of an oxide of the rare earth element. It is preferable because the plasma erosion resistance is further increased when the thermal spray coating is essentially free of a rare earth element oxide.

In a preferable embodiment, the thermal spray coating disclosed herein is characterized by the rare earth element being yttrium, the halogen being fluorine, and the rare earth element oxyhalide being an yttrium oxyfluoride. Such an embodiment allows surely for formation of a thermal spray coating having great erosion resistance to, for instance, fluorine plasma and also having improved porosity, hardness, etc.

The thermal sprayed article provided by the art disclosed herein is characterized by having a substrate surface provided with an aforementioned thermal spray coating. According to such a configuration, the thermal sprayed article is provided with excellent plasma erosion resistance.

BRIEF DESCRIPTION OF THE DRAWING

For a better understanding of the invention as well as other objects and further features thereof reference is had to the following detailed description to be read in connection with the accompanying drawing, wherein:

The single FIGURE shows X-ray diffraction spectra of thermal spray materials of (a) No. 5 and (b) No. 8 in Embodiment 2.

DETAILED DESCRIPTION OF THE INVENTION

Preferred embodiments of the present invention are described below. Matters necessary to practice this invention other than those specifically referred to in this description may be understood as design matters based on the conventional art in the pertinent field for a person of ordinary skill in the art. The present invention can be practiced based on the contents disclosed in this description and common technical knowledge in the subject field.

[Thermal Spray Material]

The thermal spray material disclosed herein comprises a rare earth element oxyhalide (RE-O—X) which comprises a rare earth element (RE), oxygen (O) and a halogen atom (X) as its elemental constituents. The thermal spray material is characterized by having an X-ray diffraction pattern that shows a main peak intensity $I_A$ corresponding to the rare earth element oxyhalide, a main peak intensity Is corresponding to a rare earth element oxide and a main peak intensity $I_C$ corresponding to a rare earth element halide at a ratio of sum of the intensities $I_B$ and $I_C$ to the intensity $I_A$, $[(I_B+I_C)/I_A]$, of less than 0.02.

In the art disclosed herein, the rare earth element (RE) is not particularly limited and can be suitably selected among elements including scandium, yttrium and lanthanides. In particular, it can be one species or a combination of two or more species among scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb) and lutetium (Lu). From the standpoint of the improved plasma erosion resistance and costs, etc., preferable species include Y, La, Gd, Tb, Eu, Yb, Dy and Ce. The rare earth element may comprise solely one species among these, or two or more species in combination.

The halogen (X) is not particularly limited, either, and can be any of the elements of Group 17 of the periodic table. In particular, it can be solely one species or a combination of two or more species among fluorine (F), chlorine (CO, bromine (Br), iodine (I) and astatine (At). The halogen may consist of at least one species among these or may comprise two or more species in combination. It can be preferably F, Cr or Br. Typical examples of the rare earth element oxyhalide include oxyfluorides, oxychlorides and oxybromides of various rare earth elements.

Here, the rare earth element oxyhalide shows superior plasma erosion resistance to yttria ($Y_2O_3$) which is known as a highly plasma erosion resistant material. It is preferable that a larger amount of such a rare earth element oxyhalide is included because notably great plasma resistance can be exhibited.

Upon thermal spraying, the rare earth element oxide in a thermal spray material may remain unchanged as the rare earth element oxide in the resulting thermal spray coating. For instance, upon thermal spraying, yttrium oxide in the thermal spray material may remain unchanged as yttrium oxide in the resulting thermal spray coating. The rare earth element oxide (e.g. yttrium oxide) shows poorer plasma resistance as compared to that of a rare earth element oxyhalide. Thus, when exposed to a plasma environment, an area containing the rare earth element oxide is susceptible to formation of a brittle modified layer and the modified layer is likely to fall as fine particles. These fine particles may be deposited as particles on a semiconductor substrate. Thus, if any, the rare earth element oxide content as a possible particle source is preferably low.

A rare earth element fluoride in a thermal spray material may be oxidized by thermal spraying to form a rare earth element oxide in the resulting thermal spray coating. For instance, yttrium fluoride in a thermal spray material can be oxidized upon thermal spraying to form yttrium oxide in the resulting thermal spray coating. Such a rare earth element oxide can be a particle source as described above. Thus, it is preferable that its content is low.

In view of the above, in the art disclosed herein, the rare earth element oxyhalide is defined to satisfy the intensity ratio $[(I_B+I_C)/I_A]<0.02$ in the X-ray diffraction pattern of the thermal spray material. When the thermal spray material comprises a plurality of rare earth element oxyhalides having different compositions, $I_A$ can be the sum of the main peaks of the respective oxyhalide species. When the thermal spray material comprises a plurality of rare earth element oxides having different compositions, $I_B$ can be the sum of the main peaks of the respective oxides. When the thermal spray material comprises a plurality of rare earth element halides having different compositions, $I_C$ can be the sum of the main peaks of the respective halide species.

The intensity ratio $[(I_B+I_C)/I_A]$ is preferably 0.01 or less, or more preferably 0.005 or less. Such an embodiment can be more preferably achieved when the thermal spray material is essentially free of a rare earth element halide. It can also be more preferably achieved when the thermal spray material is essentially free of a rare earth element oxide. It is particularly desirable that the intensity ratio $[(I_B+I_C)/I_A]$ is essentially 0 (zero). In other words, it is particularly desirable that the thermal spray material essentially consists of the rare earth element oxyhalide.

For instance, the X-ray diffraction analysis of the rare earth element oxyhalide, rare earth element oxide and rare earth element halide can be favorably carried under the following conditions: Specifically, the analysis is conducted, for instance, using an XRD analyzer (ULTIMA W available from Rigaku Corporation) with Cu Kα radiation (20 kV voltage, 10 mA current) as the X-ray source, over a scan range 2θ=10° to 70°, at a scan speed of 10°/min with a sampling interval of 0.01°. For this, it is suitable that the divergence slit is adjusted to 1°, the divergence height-limiting slit to 10 mm, the scattering slit to 1/6°, the receiving slit to 0.15 mm, and the offset angle to 0°. By such analysis, for instance, the main peaks of typical rare earth element oxyhalides, rare earth element oxides and rare earth element halides are detected around the following locations. This allows for accurate determination of the main peak intensities of the respective compounds.

<Composition: Diffraction Angle of Main Peak (θ/2θ)>

| | |
|---|---|
| $Y_2O_3$ | 29.157° |
| $YF_3$ | 27.881° |
| YOF | 28.064° |
| $Y_5O_4F_7$ | 28.114° |
| $Y_6O_5F_8$ | 28.139° |
| $Y_7O_6F_9$ | 28.137° |

In this description, to be "essentially free" of a certain component means that the fraction of the component (here, a rare earth element oxide or a rare earth element halide) is 5% by mass or less, or preferably 3% by mass or less, for example, 1% by mass or less. Such a composition can be found, for instance, by absence of detection of a diffraction peak corresponding to the component when the thermal spray material is analyzed by XRD. In this description, the fact that it essentially consists of a rare earth element oxyhalide can be shown, for instance, by absence of detection of a diffraction peak corresponding to a compound that is not a rare earth element oxyhalide when the thermal spray material is analyzed by XRD.

In the art disclosed herein, the halogen plasma is typically generated, using a plasma-forming gas comprising a halogen gas (a gaseous halogen compound). In particular, typical examples include plasma formed with solely one species or a mixture of two or more species among fluorine-based gases such as $SF_6$, $CF_4$, $CHF_3$, $ClF_3$ and HF used in a dry etching step in manufacturing semiconductor substrates; chlorine-based gases such as $Cl_2$, $BCl_3$, and HCl; and bromine-based gases such as HBr. These gases can be used as a mixture with an inert gas such as argon (Ar).

The ratio of the rare earth element (RE), oxygen (O) and halogen (X) forming the rare earth element oxyhalide is not particularly limited.

For instance, the halogen to rare earth element molar ratio (X/RE) is not particularly limited. Favorably, the molar ratio (X/RE) can be, for instance, 1. It is preferably greater than 1. In particular, for instance, it is more preferably 1.1 or greater, or desirably 1.2 or greater or even 1.3 or greater. The upper limit of the molar ratio (X/RE) is not particularly limited and can be, for instance, 3 or less. In particular, the halogen to rare earth element ratio (X/RE) is more preferably 2 or less, or yet more preferably 1.4 or less (below 1.4). A favorable molar ratio (X/RE) is, for example, 1.3 or greater, but 1.39 or less (e.g. 1.32 or greater, but 1.36 or less). This is preferable because such a high halogen to rare earth element ratio brings about greater resistance to halogen plasma.

The oxygen to rare earth element molar ratio (O/RE) is not particularly limited. For example, favorably, the molar ratio (O/RE) can also be 1; it is preferably less than 1. In particular, for instance, it is more preferably 0.9 or less, or desirably 0.88 or less or even 0.86 or less. The lower limit of the molar ratio (O/RE) is not particularly limited, either. For instance, it can be 0.1 or greater. In particular, a favorable oxygen to rare earth element molar ratio (O/RE) is, for example, greater than 0.8, but less than 0.85 (preferably 0.81 or greater, but 0.84 or less). This is preferable because such a low oxygen to rare earth element ratio allows for inhibition of the formation of a rare earth element oxide (e.g. $Y_2O_3$) in the thermal spray coating caused by oxidation during the thermal spray process.

In other words, the rare earth element oxyhalide can be, for instance, a compound having an arbitrary ratio of RE, O and X, represented by a general formula such as $RE_1O_{m1}X_{m2}$ (e.g. $0.1 \leq m1 \leq 1.2$, $0.1 \leq m2 \leq 3$). A favorable embodiment is discussed now wherein the rare earth element is yttrium (Y), the halogen is fluorine (F), and the rare earth element oxyhalide is an yttrium oxyfluoride (Y—O—F). An example of the yttrium oxyfluoride is, for instance, a thermodynamically stable compound having a chemical composition represented by YOF having a Y:O:X ratio of 1:1:1. It can be a relatively thermodynamically stable species represented by a general formula $Y_1O_{1-n}F_{1+2n}$ (in the formula, n satisfies, for instance, $0.12 \leq n \leq 0.22$), such as $Y_5O_4F_7$, $Y_6O_5F_8$, $Y_7O_6F_9$, and $Y_{17}O_{14}F_{23}$. Among them, the species having molar ratios (O/RE and X/RE) in the favorable ranges such as $Y_6O_5F_8$ and $Y_{17}O_{14}F_{23}$ are preferable because they can lead to formation of a denser and harder thermal spray coating with great plasma erosion resistance.

In the yttrium oxyfluoride example, part or all of the yttrium (Y) and part or all of the fluorine (F) can be substituted with an arbitrary rare earth element and an arbitrary halogen, respectively, for the same or a similar crystal structure can be formed.

The rare earth element oxyhalide may be formed as: a single phase of a species described above; as a mixed phase, solid solution phase or compound of two or more species in combination; or as a mixture of these; and so on.

When the thermal spray material comprises rare earth element oxyhalides having a number (e.g. a number a; when a is a natural number, a≥2) of different compositions, as for the molar ratios (X/RE and O/RE), the molar ratios (Xa/REa and Oa/REa) are determined for the respective compositions and multiplied by the abundance fractions of the respective compositions to obtain the overall molar ratios (X/RE and O/RE) for the entire rare earth element oxyhalide.

The molar ratios (X/RE and O/RE) of the rare earth element oxyhalide can be determined, for instance, based on its composition identified by X-ray diffraction analysis.

Specifically, the rare earth element oxyhalide content in the thermal spray material can be measured and determined by the following method. First, by X-ray diffraction analysis, the crystal structures of substances in the thermal spray material are identified. Here, with respect to the rare earth element oxyhalide, its atomicity (elemental ratio) is also determined.

For instance, when a species of rare earth element oxyhalide is present in the thermal spray material with the rest being $YF_3$, the oxygen content of the thermal spray material is measured by, for instance, an oxygen/nitrogen/hydrogen elemental analyzer (e.g. ONH836 available from LECO Corporation); from the resulting oxygen content, the rare earth element oxyhalide content can be quantified.

When two or more species of rare earth element oxyhalide are present or when an oxygen-containing compound such as yttrium oxide is mixed in, the fractions of the respective compounds can be quantified, for instance, by a calibration curve method. In particular, several samples varying in compositional ratio of the respective compounds are prepared; and the samples are individually analyzed by X-ray diffraction to plot calibration curves that show the relationship between the main peak intensity and the amounts of the respective compounds contained. Based on the calibration curves, their amounts contained are quantified based on the main peak intensity of the rare earth element oxyhalide in the XRD spectrum of the thermal spray material of interest.

The thermal spray material is typically provided in a powder form. Such a powder can be formed of particles prepared by granulation of finer primary particles or of a group of primary particles (which may include their aggregates). The upper limit of the average particle diameter is not particularly limited, either. The thermal spray material can have an average particle diameter of, for instance, 50 µm or smaller, preferably 40 µm or smaller, or more preferably about 35 µm or smaller. From the standpoint of the thermal spray efficiency, for instance, the average particle diameter is not particularly limited as long as it is about 30 µm or smaller. The lower limit of the average particle diameter is not particularly limited, either. In view of the fluidity of the thermal spray material, it can be, for instance, 5 µm or larger, preferably 10 µm or larger, or more preferably 15 µm or larger, for example, 20 µm or larger.

[Thermal Spray Coating]

By thermal spraying the thermal spray material described above, a thermal spray coating can be formed. When the thermal spray coating is on a surface of a substrate (base material), it is provided as a thermal sprayed article (member), etc. Such a thermal sprayed article and a thermal spray coating are described below.

(Substrate)

In the thermal sprayed article disclosed herein, the substrate on which the thermal spray coating is formed is not particularly limited. For instance, as long as the substrate is formed of a material having desirable resistance when subjected to thermal spraying of the thermal spray material, it is not particularly limited in terms of material, shape, etc. Examples of a material that constitutes such a substrate include various metallic materials such as metals, semimetals and alloys thereof as well as various inorganic materials. In particular, examples of metallic materials include metallic materials such as aluminum, aluminum alloy, iron, steel, copper, copper alloy, nickel, nickel alloy, gold, silver, bismuth, manganese, zinc and zinc alloy; and semi-metallic materials such as IV group semiconductors including silicon (Si) and germanium (Ge), II-VI group semiconductor compounds including zinc selenide (ZnSe), cadmium sulfide (CdS) and zinc oxide (ZnO), III-V group semiconductor compounds including gallium arsenide (GaAs), indium phosphide (InP) and gallium nitride (GaN), IV group semiconductor compounds including silicon carbide (SiC) and silicon germanium (SiGe), and chalcopyrite-based semiconductors including copper.inclium.selenium ($CuInSe_2$). Examples of inorganic materials include circuit board materials such as calcium fluoride (CaF) and quartz ($SiO_2$), ceramic oxides such as alumina ($Al_2O_3$) and zirconia ($ZrO_2$), ceramic nitrides such as silicon nitride ($Si_3N_4$), boron nitride (BN) and titanium nitride (TiN), and ceramic carbides such as silicon carbide (SiC) and tungsten carbide (WC). The substrate can be constituted with one species of these materials or with a composite of two or more species. Among them, favorable examples include a substrate formed of a widely-used metallic material with a relatively large thermal expansion coefficient, such as steels typified by various SUS materials (possibly so-called stainless steels), heat-resistant alloys typified by Inconel, erosion-resistant alloys typified by Hastelloy, and aluminum alloys typified by 1000-series to 7000-series aluminum alloys useful as lightweight structural materials, etc. The substrate can be, for instance, a component that constitutes semiconductor device manufacturing equipment and is exposed to highly reactive oxygen gas plasma or halogen gas plasma. It is noted that, for convenience, silicon carbide (SiC) and the like can be classified into different categories as semiconductor compounds, inorganic materials, etc., but material-wise, they are the same.

(Thermal Spray Coating)

The thermal spray coating disclosed herein is formed by thermal spraying the thermal spray material to, for instance, an arbitrary substrate surface. Thus, the thermal spray coating is formed as a coating that comprises, as its primary component, a rare earth element oxyhalide (RE-O—X), which comprises a rare earth element (RE), oxygen (O) and a halogen atom (X) as its elemental constituents.

Here, the term "primary component" refers to a component accounting for the highest percentage among the components forming the thermal spray coating. In particular, for instance, it means that the component accounts for 50% by mass or more of the entire thermal spray coating, or it may preferably accounts for 75% by mass or more, for example, 80% by mass or more. Since the rare earth element oxyhalide is the same as that in the thermal spray material, detailed description is omitted.

Although the detailed mechanism is unknown, the rare earth element oxyhalide shows excellent erosion resistance to plasma, particularly to halogen plasma. Thus, the thermal spray coating primarily comprising the rare earth element oxyhalide may exhibit notably great plasma erosion resistance.

Although not necessarily limited to this, the thermal spray coating can be characterized by having an X-ray diffraction pattern that shows a main peak intensity $I_{CA}$ corresponding to the rare earth element oxyhalide, a main peak intensity $I_{CB}$ corresponding to a rare earth element oxide and a main peak intensity $I_{CC}$ corresponding to a rare earth element halide at a ratio of sum of the intensities $I_{CB}$ and $I_{CC}$ to the intensity $I_{CA}$, $[(I_{CB}+I_{CC})/I_{CA}]$, of 0.45 or less. The peak intensities $I_{CA}$, $I_{CB}$ and $I_{CC}$ can determined as well as the peak intensities $I_A$, $I_B$ and $I_C$ of the thermal spray material, according to the description of paragraphs 0026, 0028, 0029. The XRD intensity ratio $[(I_{CB}+I_{CC})/I_{CA}]$ of the thermal spray coating is preferably 0.3 or less, more preferably 0.1 or less, or yet more preferably 0.05 or less. For example, it is particularly desirable that this intensity ratio is essentially 0 (zero). In other words, it is particularly desirable that the thermal spray coating essentially consists of a rare earth element oxyhalide.

As a more preferable embodiment, the thermal spray coating is also provided essentially free of an oxide of the rare earth element. The rare earth element oxide in the thermal spray coating can be typically a rare earth element oxide that has been in the thermal spray material and now is included unchanged in the thermal spray coating or a rare earth element oxide produced when a rare earth element halide that has been in the thermal spray material is oxidized upon thermal spraying. When a thermal spray coating is essentially free of a rare earth element oxide, the thermal spray material used for forming the thermal spray coating is also presumed to have been essentially free of a rare earth element oxide and a rare earth element halide. Rare earth element oxides are relatively hard, but are indeed brittle. Thus, when exposed to a plasma environment such as when followed by drying etching, they may give rise to particles. Because the thermal spray coating disclosed herein is essentially free of such a rare earth element oxide, it may show yet greater plasma erosion resistance.

Reduction of particles is demanded of dry etching equipment for manufacturing semiconductor devices. Possible causes of particle formation include falling of reaction products deposited in vacuum chambers as well as degradation of the chambers due to the use of halogen gas plasma or oxygen gas plasma. The larger the particle diameters are, the greater the problem is. In recent years with refined machining precision, it is necessary to strictly limit even the formation of particles having diameters of 0.2 µm or smaller (below 0.2 µm, e.g. 0.1 µm or smaller). Studies by the present inventors have shown that the number and sizes of particles formed from a thermal spray coating in a dry etching environment are greatly influenced by the composition of the thermal spray coating. For instance, with a conventional thermal spray coating, 0.2 µm or larger particles may occur, but by the use of the thermal spray material disclosed herein and proper thermal spraying operation, it is possible to obtain a thermal spray coating with excellent plasma erosion resistance. Typically, for instance, in current dry etching environments, the thermal spray coating disclosed herein will not form a modified layer that leads to formation of large particles larger than about 0.2 µm. This is because if the thermal spray coating disclosed herein is eroded in a dry etching environment, the particles occurring are formed from a modified layer formed of particles of about 0.2 µm or smaller (typically 0.1 µm or smaller). Thus, the thermal spray coating disclosed herein is less susceptible to the formation of particles of about 0.2 µm or smaller (e.g. 0.1 µm or smaller, typically 0.06 µm or smaller, preferably 19 nm or smaller, more preferably 5 nm or smaller, or most preferably 1 nm or smaller). For instance, the count of these particles is reduced to essentially zero.

Such plasma erosion resistance of a thermal spray coating can be evaluated, for instance, by the count of particles formed when the thermal spray coating is exposed to a certain plasma environment. In dry etching, an etching gas is introduced into a vacuum container (chamber) and by exciting the etching gas by high frequency, microwave, etc., to form plasma and generate radicals and ions. The radicals and ions generated in the plasma are allowed to react with a workpiece (wafer) subject to etching and the reaction products are eliminated as a volatile gas to the outside, whereby the workpiece is finely processed. For instance, in an actual parallel plate RIE (reactive ion etching) system, a pair of parallel plates is placed in the etching chamber. High frequency is applied to one of the electrodes to form plasma; a wafer is placed at the electrode and etching is carried out. The plasma is generated in a pressure range of about 10 mTorr or higher, but 200 mTorr or lower. As the etching gas, as described earlier, the possibilities include various halogen gases, oxygen gas and inert gases. When evaluating the plasma erosion resistance of a thermal spray coating, it is suitable to use a mixture of a halogen gas and oxygen gas (e.g. a mixture of argon, carbon tetrafluoride and oxygen at a certain volume ratio) as the etching gas. The flow rate of the etching gas is preferably, for instance, about 0.1 L/min or higher, but 2 L/min or lower.

After the thermal spray coating is stored in such a plasma environment for a certain time period (e.g. the time period required for processing 2000 semiconductor substrates (silicon wafers, etc.), the number of particles formed can be counted to favorably evaluate the plasma erosion resistance of the thermal spray coating. Here, to achieve a high level of quality control, for instance, particles of 0.06 µm or larger in diameter can be counted, but this can be suitably changed in accordance with the required quality. For example, regarding the particles in such a size range, plasma erosion resistance can be evaluated by means of counting the number of particles deposited per unit area of semiconductor substrate to determine the particle count (counts per $cm^2$) and the like.

In a preferable embodiment of the thermal spray coating disclosed herein, the particle count can be reduced to at most about 4 counts per $cm^2$.

For example, when particles are formed under the conditions specified below, the particle count can be 4 counts per $cm^2$ or less. Such an embodiment is preferable because the thermal spray coating can be obtained with surely increased plasma erosion resistance.

[Conditions for Particle Counting]

In a parallel plate plasma etching system, a 70 mm by 50 mm thermal spray coating is placed at the upper electrode. A 300 mm diameter substrate subject to plasma treatment is placed on the stage. To reproduce a state of the thermal spray coating after long-term use, a dummy run is conducted for a total of 100 hours where 2000 substrates (silicon wafers) are subjected to plasma dry etching. The conditions of the plasma formation are as follows: 13.3 Pa (100 mTorr) pressure, argon/carbon tetrafluoride/oxygen gas mixture as etching gas, and 13.56 MHz/4000 W applied power. Subsequently, a substrate (silicon wafer) for monitoring the measurement is placed on the stage and plasma is generated for 30 seconds under the same conditions as above. Before and after the plasma treatment, the number of 0.06 μm diameter or larger particles deposited on the substrate for measurement monitoring is counted. Here, for the evaluation, the product of dividing the particle count by the area of the substrate can also be used as the particle count (counts per cm$^2$). For this, a gas mixture comprising argon, carbon tetrafluoride and oxygen can be used as the etching gas. The flow rate of the etching gas is, for instance, 1 L/min.

(Coating-Formation Method)

The thermal spray coating can be formed by supplying the thermal spray material disclosed herein to a thermal spray system based on a known thermal spray method. The favorable thermal spray method for the thermal spray material is not particularly limited. Favorable examples include plasma thermal spray method, high-velocity flame thermal spray method, flame thermal spray method, detonation thermal spray method and aerosol deposition method. The properties of a thermal spray coating may depend on the thermal spray method and its conditions to some degree. However, regardless of the thermal spray method and conditions employed, by using the thermal spray material disclosed herein, it is possible to form a thermal spray coating having superior plasma erosion resistance to that of thermal spray coatings formed of other thermal spray materials.

EXAMPLES

Several Examples related to the present invention are described below, but the present invention is not to be limited to these Examples.

[Embodiment 1]

As Thermal Spray Material No. 1, was obtained an yttrium oxide powder generally used as a protective coating on members in semiconductor device manufacturing equipment. As Thermal Spray Material No. 2, was obtained an yttrium fluoride powder being a rare earth element halide. An yttrium-containing compound and a fluorine-containing compound were suitably mixed and calcined to obtain Thermal Spray Materials Nos. 3 to 8 in powder forms. These thermal spray materials were tested for physical properties. The results are shown in Table 1. In Table 1, for reference, among the thermal spray materials disclosed in Patent Document 1, the data of thermal spray materials (Examples 10 and 11 in Patent Document 1) with relatively high YOF contents are also shown together as Comparative Examples A and B.

TABLE 1

| No. | XRD-detected phases of thermal spray material | Relative intensities of XRD main peaks | | | | | | Intensity ratio $(I_B + I_C)/I_A$ | Oxygen (wt %) |
| --- | --- | --- | --- | --- | --- | --- | --- | --- | --- |
| | | $Y_2O_3$ | $YF_3$ | YOF | Y—O—F species | | | | |
| | | | | | $Y_7O_6F_9$ | $Y_6O_5F_8$ | $Y_5O_4F_7$ | | |
| 1 | $Y_2O_3$ | 100 | 0 | 0 | 0 | 0 | 0 | — | 21.3 |
| 2 | $YF_3$ | 0 | 100 | 0 | 0 | 0 | 0 | — | <0.1 |
| 3 | $YF_3$ YOF | 0 | 45 | 100 | 0 | 0 | 0 | 0.45 | 10.1 |
| 4 | $YF_3$ YOF | 0 | 11 | 100 | 0 | 0 | 0 | 0.11 | 11.6 |
| 5 | YOF | 0 | 0 | 100 | 0 | 0 | 0 | 0 | 12.9 |
| 6 | $Y_7O_6F_9$ | 0 | 0 | 0 | 100 | 0 | 0 | 0 | 10.0 |
| 7 | $Y_6O_5F_8$ | 0 | 0 | 0 | 0 | 100 | 0 | 0 | 10.5 |
| 8 | $Y_5O_4F_7$ | 0 | 0 | 0 | 0 | 0 | 100 | 0 | 12.5 |
| A | $Y_2O_3$ $YF_3$ YOF | 1 | 1 | 100 | 0 | 0 | 0 | 0.02 | 12.9 |
| B | $Y_2O_3$ YOF | 4 | 0 | 100 | 0 | 0 | 0 | 0.04 | 13.2 |

| No. | Fluorine (wt %) | Ratio of respective crystal phases (wt %) | | | | | | Average particle diameter (mm) |
| --- | --- | --- | --- | --- | --- | --- | --- | --- |
| | | $YF_3$ | $Y_2O_3$ | YOF | Y—O—F species | | | |
| | | | | | $Y_7O_6F_9$ | $Y_6O_5F_8$ | $Y_5O_4F_7$ | |
| 1 | 0 | 0 | 100 | 0 | 0 | 0 | 0 | 31 |
| 2 | 39.1 | 100 | 0 | 0 | 0 | 0 | 0 | 28 |
| 3 | 20.5 | 23 | 0 | 77 | 0 | 0 | 0 | 26 |
| 4 | 17.7 | 11 | 0 | 89 | 0 | 0 | 0 | 30 |
| 5 | 15.3 | 0 | 0 | 100 | 0 | 0 | 0 | 28 |
| 6 | 20.8 | 0 | 0 | 0 | 100 | 0 | 0 | 33 |
| 7 | 24.0 | 0 | 0 | 0 | 0 | 100 | 0 | 32 |
| 8 | 23.4 | 0 | 0 | 0 | 0 | 0 | 100 | 32 |
| A | — | 0.1 | 99.9 | 0 | 0 | 0 | 0 | — |
| B | — | 0 | 2.1 | 97.9 | 0 | 0 | 0 | — |

In Table 1, the column headed "XRD-detected phases of thermal spray material" gives the crystal phases detected as a result of powder XRD analysis of each thermal spray material. In the same column, $Y_2O_3$ indicates detection of a phase formed of yttrium oxide, YF3 yttrium fluoride, Y5O4F7 an yttrium oxyfluoride represented by $Y_5O_4F_7$, Y6O5F8 an yttrium oxyfluoride represented by $Y_6O_5F_8$, Y7O6F9 an yttrium oxyfluoride represented by $Y_7O_6F_9$, and YOF an yttrium oxyfluoride represented by YOF ($Y_1O_1F_1$).

The analysis was carried out using an XRD analyzer (ULTIMA IV available from Rigaku Corporation) with CuKα radiation (20 kV voltage, 10 mA current) as the X-ray source (scan rage 2θ=10° to 70°, scan speed 10°/min, sampling interval 0.01°). The divergence slit was adjusted to 1°, the divergence height-limiting slit to 10 mm, the scattering slit to 1/6°, the receiving slit to 0.15 mm, and the offset angle to 0°. For reference, the XRD spectra obtained with Thermal Spray Materials No. 5 and No. 8 are shown in FIGURE (a) and (b), respectively.

In Table 1, the column headed "Relative intensities of XRD main peaks" shows the intensities of the main peaks of the respective crystal phases detected in the diffraction pattern obtained with each thermal spray material by the powder XRD analysis, given as relative values with the highest main peak intensity being 100.

In Table 1, the column headed "Intensity ratio $(I_B+I_C)/I_A$" gives the ratio of the sum of the main peak intensities $I_B$ and $I_C$ of the rare earth element oxides and rare earth element halides to the total main peak intensity $I_A$ of the rare earth element oxyhalide, determined based on the relative intensities of the main peaks of the respective crystal phases detected above.

In Table 1, the columns headed "Oxygen" and "Fluorine" show the measurement results of the oxygen and fluorine contents of each thermal spray material, respectively. These oxygen and fluorine contents are the values measured with an oxygen/nitrogen/hydrogen elemental analyzer (ONH836 available from TECO Corporation) and an automated fluorine ion analyzer (Model FLIA-101 available from Horiba, Ltd.), respectively.

In Table 1, the column headed "Ratio of respective crystal phases" gives the ratio of the respective crystal phases detected for each thermal spray material with the total of the four different crystal phases being 100% by mass, determined based on the relative intensity of the XRD main peak and the oxygen and fluorine contents.

In Table 1, the column headed "Average particle diameter" gives the average particle diameter of each thermal spray material. The average particle diameter is the D50 value by weight measured with a laser diffraction/scattering particle size distribution analyzer (LA-300 available from Horiba, Ltd.).

(Evaluations)

The XRD analysis data has revealed that single yttrium oxyfluoride phases were obtained as Thermal Spray Materials Nos. 5 to 8. The results of the intensity ratio in Table 1 show that the thermal spray material disclosed herein was obtained as Thermal Spray Materials Nos. 5 to 8.

As shown by the ratio of the respective crystal phases in Table 1, with a thermal spray material with the intensity ratio below 0.02, essentially only a rare earth element oxyhalide is detected in its XRD pattern.

[Embodiment 2]

By plasma thermal spraying of Thermal Spray Materials Nos. 1 to 8, thermal sprayed articles were fabricated, comprising thermal spray coatings of Nos. 1 to 8. The thermal spray was carried out under the conditions below.

In particular, as the substrate, a 70 mm by 50 mm by 2.3 mm plate of an aluminum alloy (A16061) was obtained, blasted with a brown alumina abrasive (A#40) and used. The plasma thermal spray was carried out, using a commercial plasma spray gun (SG-100 available from Praxair Surface Technologies). Using argon gas at 50 psi (0.34 MPa) and helium gas at 50 psi (0.34 MPa) as the plasma gas, plasma was generated at 37.0 V voltage and 900 A current. The thermal spray materials were supplied with a powder feeder (Model 1264 available from Praxair Surface Technologies) to the thermal spray device at a rate of 20 g/min to form 200 µm thick thermal spray coatings. The feed rate of the spray gun was set to 24 m/min and spray distance to 90 mm.

The resulting thermal spray coatings were tested for physical properties. The results are shown in Table 2 below. The thermal spray coatings were exposed to halogen plasma and the particle counts were determined by the following three different methods. The results are shown in Table 2. Of the column headings for the data shown in Table 2, those in common with Table 1 give the results of subjecting the thermal spray coatings to the same tests.

TABLE 2

| No. | Crystal phases of thermal spray material (See Table 1) | Intensity ratio $(I_B + I_C)/I_A$ | XRD-detected phases of thermal spray coating | Relative intensities of XRD main peaks (—) | | | | |
|---|---|---|---|---|---|---|---|---|
| | | | | $Y_2O_3$ | $YF_3$ | Y—O—F species | | |
| | | | | | | YOF | $Y_7O_6F_9$ | $Y_6O_5F_8$ |
| 1 | 100% $Y_2O_3$ | — | $Y_2O_3$ | 100 | 0 | 0 | 0 | 0 |
| 2 | 100% $YF_3$ | — | $YF_3$ $Y_2O_3$ | 30 | 100 | 0 | 0 | 0 |
| 3 | 22% $YF_3$ 78% YOF | 0.45 | YOF $Y_2O_3$ | 65 | 0 | 100 | 0 | 0 |
| 4 | 10% $YF_3$ 90% YOF | 0.11 | YOF $Y_2O_3$ | 46 | 0 | 100 | 0 | 0 |
| 5 | 100% YOF | 0 | YOF $Y_2O_3$ | 41 | 0 | 100 | 0 | 0 |
| 6 | 100% $Y_7O_6F_9$ | 0 | YOF $Y_7O_6F_9$ | 0 | 0 | 100 | 90 | 0 |
| 7 | 100% $Y_6O_5F_8$ | 0 | YOF $Y_6O_5F_8$ | 0 | 0 | 100 | 0 | 85 |
| 8 | 100% $Y_5O_4F_7$ | 0 | YOF $Y_5O_4F_7$ | 0 | 0 | 67 | 0 | 0 |

TABLE 2-continued

| | | | | | | | | |
|---|---|---|---|---|---|---|---|---|
| A | 0.1% YF$_3$ 99.9% (YOF + Y$_2$O$_3$) | 0.02 | — | | — | — | — | — |
| B | 2.1% Y$_2$O$_3$ 97.9% YOF | 0.04 | — | | — | — | — | — |

| No. | Relative intensities of XRD main peaks (—) Y—O—F species Y$_5$O$_4$F$_7$ | Intensity ratio (I$_{CB}$ + I$_{CC}$)/I$_{CA}$ | Porosity (%) | Vickers hardness (Hv200 g) | Particle count (1) | Particle count (2) | Particle count (3) |
|---|---|---|---|---|---|---|---|
| 1 | 0 | — | 12.5 | 450 | E | E | E |
| 2 | 0 | — | 13.4 | 213 | D | D | D |
| 3 | 0 | 0.65 | 14.3 | 214 | D | D | D |
| 4 | 0 | 0.46 | 17.4 | 202 | C | C | C |
| 5 | 0 | 0.41 | 11.7 | 291 | C | C | C |
| 6 | 0 | 0 | 13.7 | 364 | A | A | A |
| 7 | 0 | 0 | 11.4 | 352 | A | A | A |
| 8 | 100 | 0 | 12.4 | 391 | B | B | B |
| A | — | — | — | — | (15)* | D | D |
| B | — | — | — | — | (24)* | D | D |

In Table 2, the column headed "Crystal phases of thermal spray material" gives the crystal phases constituting the respective thermal spray materials and their approximate ratio based on the ratio of the respective crystal phases determined in Embodiment 1 as well as their XRD analysis data.

In Table 2, the column headed "XRD-detected phased of thermal spray coating" gives the crystal phases detected as a result of powder XRD analysis of each thermal spray coating.

In Table 2, the column headed "Intensity ratio (I$_{CB}$+I$_{CC}$)/I$_{CA}$" gives the ratio of the sum of the main peak intensities I$_{CB}$ and I$_{CC}$ of the rare earth element oxide and rare earth element halide to the total main peak intensity I$_{CA}$ of the rare earth element oxyhalide(s), determined based on the relative intensities of the main peaks of the respective crystal phases detected above.

In Table 2, the column headed "Porosity" shows the measurement result of the porosity of each thermal spray coating. The porosity measurement was carried out as follows: The thermal spray coating was cut across a plane orthogonal to the substrate surface; the resulting cross section was resin-filled and polished, and then an image of the cross section was taken with a digital microscope (VC-7700 available from Omron Corporation). The image was analyzed by image analysis software (IMAGE PRO available from Nippon Roper K. K.) to identify pore areas in the cross section image. The ratio of the pore areas to the entire cross section was calculated to determine the porosity.

In Table 2, the column headed "Vickers harness" shows the measurement result of the Vickers hardness of each thermal spray coating. It refers to the Vickers hardness (HV 0.2) determined based on JIS R1610:2003, using a micro hardness tester (HMV-1 available from Shimadzu Corporation) with a test load of 1.96 N applied by a diamond indenter having an apical angle of 136°.

In Table 2, the column headed "Particle count (1)" gives the result of counting the number of particles formed when each thermal spray coating was exposed to plasma under the following conditions: The thermal spray coating surface of each thermal sprayed article fabricated above was first mirror-polished with colloidal silica with 0.06 μm in average particle diameter. The thermal sprayed article was placed on the part corresponding to the upper electrode in the chamber of parallel plate semiconductor manufacturing equipment so that the polished surface was exposed. A dummy run was carried out for 100 hours in which 2000 silicon wafers of 300 mm in diameter were placed on the stage in the chamber and subjected to plasma dry etching. The plasma used in the etching process was generated by applying 4000 W high frequency power at 13.56 MHz while keeping the pressure inside the chamber at 13.3 Pa and supplying, at a flow rate of 1 L/min, an etching gas containing argon, carbon tetrafluoride and oxygen at a prescribed ratio. Subsequently, on the stage inside the chamber, a silicon wafer of 300 mm in diameter for particle counting was placed and plasma was generated for 30 seconds under the same conditions as above. Upon this, the number of particles deposited from the thermal spray coating onto the silicon wafer for particle counting was counted. For the particle count, the total number of particles of 0.06 μm (60 nm) or larger in diameter was counted with a particle counter (wafer surface tester SURFSCAN SP2) available from KLA-Tencor Corporation. For the total particle count, particles on the silicon wafer were counted before and after the 30 second plasma etching and the difference was recorded as the count (total count) of particles that had been formed from the thermal spray coating after aged (after the dummy run) and deposited onto the silicon wafer. The particle count was graded by determining its relative value with the particle count of the thermal spray coating of No. 1 formed of 100% yttria being 100 (reference).

In the column for Particle count (1), "A" is given when the particle count (relative value) was less than 1; "B" when 1 or greater, but less than 5; "C" when 5 or greater, but less than 15; "D" when 15 or greater, but less than 100; and "E" when 100 or greater.

The particle counts of the thermal spray coatings obtained from the materials of Comparative Examples A and B refer to the values of counting particles of about 0.2 μm or larger in particle diameter deposited on silicon wafer surfaces under the plasma etching conditions according to Patent Document 1.

In Table 2, the column headed "Particle count (2)" shows the particle count resulted when wafer surface tester SURFSCAN SP5 was used in place of SURFSCAN SP2 both available from KLA-Tencor Corporation. SURFSCAN SP5 can detect particles of 19 nm or larger in diameter. Particle count (2) shows the result when finer particles deposited on the silicon wafer were included in the count. For the total particle count, particles on the silicon wafer were counted before and after the 30 second plasma etching and the difference was recorded as the count (total count) of particles that had been formed from the thermal spray coating after aged and deposited onto the silicon wafer. The particle count was graded by determining its relative value with the particle count per unit area of the thermal spray coating of No. 1 formed of 100% yttria being 100 (reference).

In the column for Particle count (2), "A" is given when the particle count (relative value) was less than 1; "B" when 1 or greater, but less than 5; "C" when 5 or greater, but less than 15; "D" when 15 or greater, but less than 100; and "E" when 100 or greater.

In Table 2, the column headed "Particle count (3)" shows the particle count when each thermal spray coating was irradiated with plasma under the conditions below and subjected to ultrasound to induce release of particles from the thermal spray coating.

In particular, in this experiment, the coating surface of the thermal sprayed article obtained was mirror-polished and the thermal spray coating was covered at its four corners with masking tape to obtain a test piece with a 10 mm by 10 mm exposed thermal spray coating area. The test piece was placed at the upper electrode of the semiconductor device manufacturing equipment. While keeping the pressure inside the chamber at 13.3 Pa, an etching gas containing carbon tetrafluoride and oxygen at a prescribed ratio was supplied at a flow rate of 1 L/min, and 700 W high frequency power at 13.56 MHz was applied for a total of one hour to expose the test piece to plasma. Subsequently, air was supplied to the chamber and the thermal spray coating of the test piece after plasma exposure was subjected to ultrasound at 22 Hz at an output power of 400 W for 30 seconds to extricate particles from the thermal spray coating and particles in air were counted with a counter. For the particle count, the total number of particles of 100 nm or larger in diameter was counted, using a particle counter (LASAIR available from PMS). The result was graded by determining its relative value with the particle count of the thermal spray coating of No. 1 formed of 100% yttria being 100 (reference).

In the column for Particle count (3), "A" is given when the particle count (relative value) was less than 10; "B" when 10 or greater, but less than 25; "C" when 25 or greater, but less than 50; "D" when 50 or greater, but less than 90; and "E" when 90 or greater.

(Evaluations)

As evident from the results of No. 1 in Table 2, thermal spray coatings formed by thermal spraying of a thermal spray material made of solely $Y_2O_3$ essentially consist of $Y_2O_3$, showing no sign of further oxidative decomposition and the like of $Y_2O_3$ occurring during thermal spraying.

The results of Nos. 2 to 5 have revealed that with respect to a thermal spray coating formed by thermal spraying of a thermal spray material consisting of $YF_3$ or YOF or comprising a mixture phase of these, $YF_3$ or YOF is partially oxidized to $Y_2O_3$, whereby the thermal spray coating includes $Y_2O_3$. In particular, in the results of Nos. 3 and 4, 10% by mass of the $YF_3$ contained in the thermal spray material was completely oxidized to $Y_2O_3$. This shows that when $YF_3$ and YOF are present together in a thermal spray material, YOF is more stable to oxidation and $YF_3$ tends to be oxidized first.

According to the results of Nos. 5 to 8, among the yttrium oxyfluorides in thermal spray materials, species with lower oxygen contents than YOF—such as $Y_7O_6F_9$, $Y_6O_5F_8$ and $Y_5O_4F_7$—are oxidized by thermal spraying to the more stable YOF phase first, without directly forming $Y_2O_3$. It has been also found that thermal spray materials such as Nos. 6 to 8 do not form $Y_2O_3$ in the resulting thermal spray coating in a general atmospheric plasma spray method like the present embodiment. In other words, it has been shown that, as a thermal spray material, the use of an yttrium oxyfluoride with a lower oxygen content than YOF can reduce the formation of $Y_2O_3$ in the resulting thermal spray coating.

Particle Count (1):

As for the physical properties of the thermal spray coatings, in the plasma environment from the thermal spray coating of No. 1 consisting solely of $Y_2O_3$, with (E)100 (reference) being the count of particles formed the particle counts per unit area of silicon wafer reached as many as about 500 to 1000 counts per wafer. In general, yttria-based thermal spray coatings are known to show superior plasma erosion resistance to that of alumina-based thermal spray coatings and the like. In this embodiment, however, the thermal spray coating formed of $Y_2O_3$ resulted in the highest particle count, exhibiting the poorest plasma resistance among all the thermal spray coatings.

With the thermal spray coating of No. 2, the count of particles formed in the plasma environment was (D) 15 or greater, but less than 100. The thermal spray coating of No. 2 has a relatively high ratio of $Y_2O_3$ formed by oxidation of $YF_3$ that had been in the thermal spray material. Thus, when exposed to fluorine plasma, it is likely to be altered to form a brittle modified layer. When exposed to a plasma environment in subsequent dry etching, it is likely to fall as particles to accumulate on a semiconductor substrate. Accordingly, it has been shown that the inclusion of $Y_2O_3$ in a thermal spray coating decreases the plasma erosion resistance.

It is noted that among the particles detected, about 90% or more were ultrafine particles ($\geq 0.06$ μm, <0.2 μm) which had never been subject to control.

With respect to the counts of particles formed from these thermal spray coatings in the plasma environment, No. 3 was comparable to No. 2; however, as for Nos. 4 and 5, with decreasing amount of $Y_2O_3$, the particle counts decreased to (C) less than 15. This suggests that YOF present in a thermal spray coating is extremely stable to plasma and effectively inhibits the plasma-caused peeling of the $Y_2O_3$-containing modified layer.

It is noted that, presumably, both YOF and $Y_2O_3$ are present in the thermal spray coatings obtained by thermal spraying the thermal spray materials of Comparative Examples A and B. In comparison of the particle counts between Comparative Examples A and B, even a slight increase in $Y_2O_3$ content of the thermal spray coating can greatly impair the plasma erosion resistance.

As shown with Nos. 6 to 8, it has become evident that, with respect to a thermal spray coating essentially consisting of an yttrium oxyfluoride and being free of $YF_3$ and $Y_2O_3$, the particle count can be reduced to a notably low level ((A) to (B), below 5). It can be said that these thermal spray coatings with well-balanced appropriate porosity and Vickers hardness are of good qualities. Also, with respect to these particles, almost all were ultrafine, having diameters of 0.06 μm or larger, but smaller than 0.2 μm.

It is noted that the thermal spray coatings of Nos. 9 and 10 formed with $Y_7O_6F_9$ and $Y_6O_5F_8$ as the thermal spray materials showed further superior plasma erosion resistance to the thermal spray coating of No. 11 formed with $Y_5O_4F_7$ as the thermal spray material. From the standpoint of the porosity, the thermal spray coating of No. 11 is considered more preferable.

With respect to the thermal spray coatings of Nos. 1 and 3 to 5, the $Y_2O_3$ main peak intensities show a tendency that, with decreasing $Y_2O_3$ content, the porosity increases while the Vickers hardness decreases. To the contrary, the thermal spray coating of No. 5 has significantly improved porosity and Vickers hardness value. This suggests that these properties are affected not only by the composition of the crystal phases constituting the thermal spray coating, but also by the crystal phases constituting the thermal spray material.

Studies of the crystal phases constituting the thermal spray materials have led to the following findings: The inclusion of yttrium oxide in a thermal spray material is not preferable because the yttrium oxide in the thermal spray material will be included as is in the resulting thermal spray coating (See No. 1); the inclusion of yttrium fluoride in a thermal spray material is not preferable because it will result in a higher count of particles formed in a plasma environment than with an yttrium oxyfluoride (See Nos. 2 to 4); between yttrium oxide and yttrium fluoride, yttrium oxide is less suitable as a thermal spray material (See Nos. 1-2 and Comparative Examples A and B); on the other hand, the inclusion of an yttrium oxyfluoride in a thermal spray material is preferable because it enhances the plasma erosion resistance in addition to the physical properties such as porosity and Vickers hardness of the resulting thermal spray coating (See Nos. 3-8).

From the above, it can be said that in a thermal spray material, the lower the ratios of the rare earth element oxide (yttrium oxide, here) and rare earth element fluoride (yttrium fluoride, here) to the rare earth element oxyhalide (yttrium oxyfluoride, here) are, the better the porosity and Vickers hardness are in addition to the plasma erosion resistance. It is preferable that the relative intensity ratio of these crystal phases—i.e. the intensity ratio $(I_B+I_C)/I_A$—is kept, for instance, below 0.02. With respect to a thermal spray coating formed with such a thermal spray material, it is preferable that the intensity ratio $(I_{CB}+I_{CC})/I_{CA}$ is, for instance, 0.45 or less.

Particle Count (2):

As shown in Table 2, the particle count (2) results were well comparable to the particle count (1) results. Thus, it has been found that, with respect to a thermal spray coating formed by thermal spraying the thermal spray material disclosed herein, the particle count is relatively significantly decreased and even the formation of particles as fine as 19 nm to 60 nm in particular is reduced to a low level in comparison to the thermal spray coating of No. 1 formed of solely $Y_2O_3$. 19 nm or larger particles are the smallest particles that can be currently detected. In the results, such fine particles were almost nonexistent (close to zero). This confirms that the thermal spray coating produced from the thermal spray material disclosed herein still exhibits high plasma erosion resistance even when the lower particle detection limit is further improved.

Particle Count (3):

As shown in Table 2, the particle count (3) results agreed well with the results of the particle counts (1) and (2). However, the particles detected in the particle count (3) are relatively large particles of at least 100 nm and the thresholds for A to D are also set closer to E. In other words, according to the particle count (3), a greater amount of larger particles are formed due to the ultrasound shock waves and made available for detection. This suggests that according to the particle count (3), in addition to the particles directly formed by halogen plasma irradiation, it is even possible to assess particle sources from which particles have not been actually formed yet, but can be formed later on. The particle sources are of the modified thermal spray coating (modified layer) formed by halogen plasma irradiation and can be thought as portions that may form particles during subsequent plasma etching. This indicates that by subjecting to ultrasound a thermal spray coating that has been exposed to halogen plasma, the plasma erosion resistance of the thermal spray coating can be evaluated more accurately. The particle count (3) also allows predicting the occurrence of particles formed from the thermal spray coating, for instance, for a case where more than 2000 silicon wafers are processed. For instance, with respect to the thermal spray coatings of Nos. 6 to 8, the results of Table 2 show that the occurrence of particles when exposed to halogen plasma was reduced to a greater extent.

Although specific embodiments of the present invention have been described in detail above, these are merely for illustrations and do not limit the scope of claims. The art according to the claims includes various modifications and changes made to the specific embodiments illustrated above.

What is claimed is:

1. A thermal sprayed article comprising:
    a substrate; and
    a thermal spray coating deposited on a surface of the substrate by thermal spraying of a thermal spray material, the thermal spray material comprising a yttrium oxyfluoride comprising a yttrium (Y), oxygen (O) and a fluorine (F) as its elemental constituents, wherein the thermal spray material has an X-ray diffraction pattern that shows a main peak intensity $I_A$ corresponding to the yttrium oxyfluoride, a main peak intensity $I_B$ corresponding to a yttrium oxide and a main peak intensity $I_C$ corresponding to a yttrium fluoride at a ratio of sum of the intensities $I_B$ and $I_C$ to the intensity $I_A$, $[(I_B+I_C)/I_A]$, of less than 0.02, and
    wherein the thermal spray coating comprises a $Y_6O_5F_8$ phase.

2. A thermal sprayed article comprising:
    a substrate; and
    a thermal spray coating deposited on a surface of the substrate, the thermal spray coating comprising
        a yttrium oxyfluoride, as its primary component, comprising a yttrium (Y), oxygen (O) and a fluorine (F) as its elemental constituents and a $Y_6O_5F_8$ phase, and
        having an X-ray diffraction pattern that shows a main peak intensity $I_{CA}$ corresponding to the yttrium oxyfluoride, a main peak intensity $I_{CB}$ corresponding to a yttrium oxide and a main peak intensity $I_{CC}$ corresponding to a yttrium fluoride at a ratio of sum of the intensities $I_{CB}$ and $I_{CC}$ to the intensity $I_{CA}$, $[(I_{CB}+I_{CC})/I_{CA}]$, of 0.45 or less.

3. The thermal sprayed article of claim 2, wherein the thermal spray coating lacks a detectable X-ray diffraction peak corresponding to a yttrium oxide.

4. The thermal sprayed article of claim 2, wherein the thermal spray coating further comprises a YOF phase.

5. The thermal sprayed article of claim 2, wherein the thermal spray coating consisting essentially of yttrium oxyfluoride.

6. The thermal sprayed article of claim 2, wherein the thermal spray coating has a Vickers hardness of 291 to 391.

7. The thermal sprayed article of claim 2, wherein the thermal spray coating has a porosity of 11.4% to 13.7%.

8. The thermal sprayed article of claim 2, wherein the thermal spray coating has a porosity of 11.4% to 12.4%.

* * * * *